US012205550B2

(12) United States Patent
Cheng et al.

(10) Patent No.: US 12,205,550 B2
(45) Date of Patent: Jan. 21, 2025

(54) IMAGE DISPLAY METHOD, IMAGE DISPLAY DEVICE AND DISPLAY SYSTEM

(71) Applicants: Analogix (Suzhou) Semiconductor Co., LTD., Jiangsu (CN); ANALOGIX INTERNATIONAL LLC, Wilmington, DE (US)

(72) Inventors: Lin Cheng, Beijing (CN); Qinghong Lai, Beijing (CN); Shan Wang, Beijing (CN); Jialian Wu, Beijing (CN)

(73) Assignees: Analogix (Suzhou) Semiconductor Co., LTD., Jiangsu (CN); ANALOGIX INTERNATIONAL LLC

( * ) Notice: Subject to any disclaimer, the term of this patent is extended or adjusted under 35 U.S.C. 154(b) by 0 days.

(21) Appl. No.: 17/926,636

(22) PCT Filed: Jan. 13, 2022

(86) PCT No.: PCT/CN2022/071879
§ 371 (c)(1),
(2) Date: Nov. 21, 2022

(87) PCT Pub. No.: WO2023/133770
PCT Pub. Date: Jul. 20, 2023

(65) Prior Publication Data

US 2024/0355300 A1 Oct. 24, 2024

(51) Int. Cl.
*G09G 3/34* (2006.01)
*G09G 3/20* (2006.01)
*G09G 3/36* (2006.01)

(52) U.S. Cl.
CPC ......... *G09G 3/3426* (2013.01); *G09G 3/2007* (2013.01); *G09G 3/3607* (2013.01);
(Continued)

(58) Field of Classification Search
CPC .. G09G 3/3426; G09G 3/3607; G09G 3/2007; G09G 2320/0233;
(Continued)

(56) References Cited

U.S. PATENT DOCUMENTS

2013/0314459 A1 11/2013 Nakanishi
2014/0092147 A1* 4/2014 Kimura ................ G09G 3/3426
345/87

(Continued)

FOREIGN PATENT DOCUMENTS

CN 102097068 A 6/2011
CN 109493814 A 3/2019

(Continued)

*Primary Examiner* — Muhammad N Edun
(74) *Attorney, Agent, or Firm* — Samson G. Yu

(57) ABSTRACT

The disclosure discloses an image display method, an image display device and a display system. The method includes: according to a image to be displayed, determining a maximum brightness value of pixel points in a panel partition to obtain a backlight brightness value corresponding to a backlight partition; acquiring a light diffusion curve of the backlight of the backlight partition incident on the panel partition corresponding to the backlight partition; calculating a compensation ratio of a target pixel to the light diffusion curve, the compensation ratio is a ratio of the maximum brightness value to an actual brightness value; calculating a pixel compensation value of the target pixel according to the image to be displayed and the compensation ratio; adjusting a pixel value of the target pixel point according to the pixel compensation value.

12 Claims, 5 Drawing Sheets

(52) U.S. Cl.
CPC ............... *G09G 2320/0233* (2013.01); *G09G 2320/0242* (2013.01); *G09G 2320/0673* (2013.01); *G09G 2320/0686* (2013.01)

(58) Field of Classification Search
CPC ... G09G 2320/0242; G09G 2320/0673; G09G 2320/0686
See application file for complete search history.

(56) References Cited

U.S. PATENT DOCUMENTS

| | | | | |
|---|---|---|---|---|
| 2017/0084232 | A1* | 3/2017 | Yang .................... | G09G 3/3426 |
| 2018/0090076 | A1* | 3/2018 | Zhang .................... | G09G 3/342 |
| 2018/0246375 | A1* | 8/2018 | Zhang ............... | G02F 1/133602 |

FOREIGN PATENT DOCUMENTS

| | | | |
|---|---|---|---|
| CN | 109817170 | A | 5/2019 |
| CN | 110136657 | A | 8/2019 |

* cited by examiner

FIG. 2

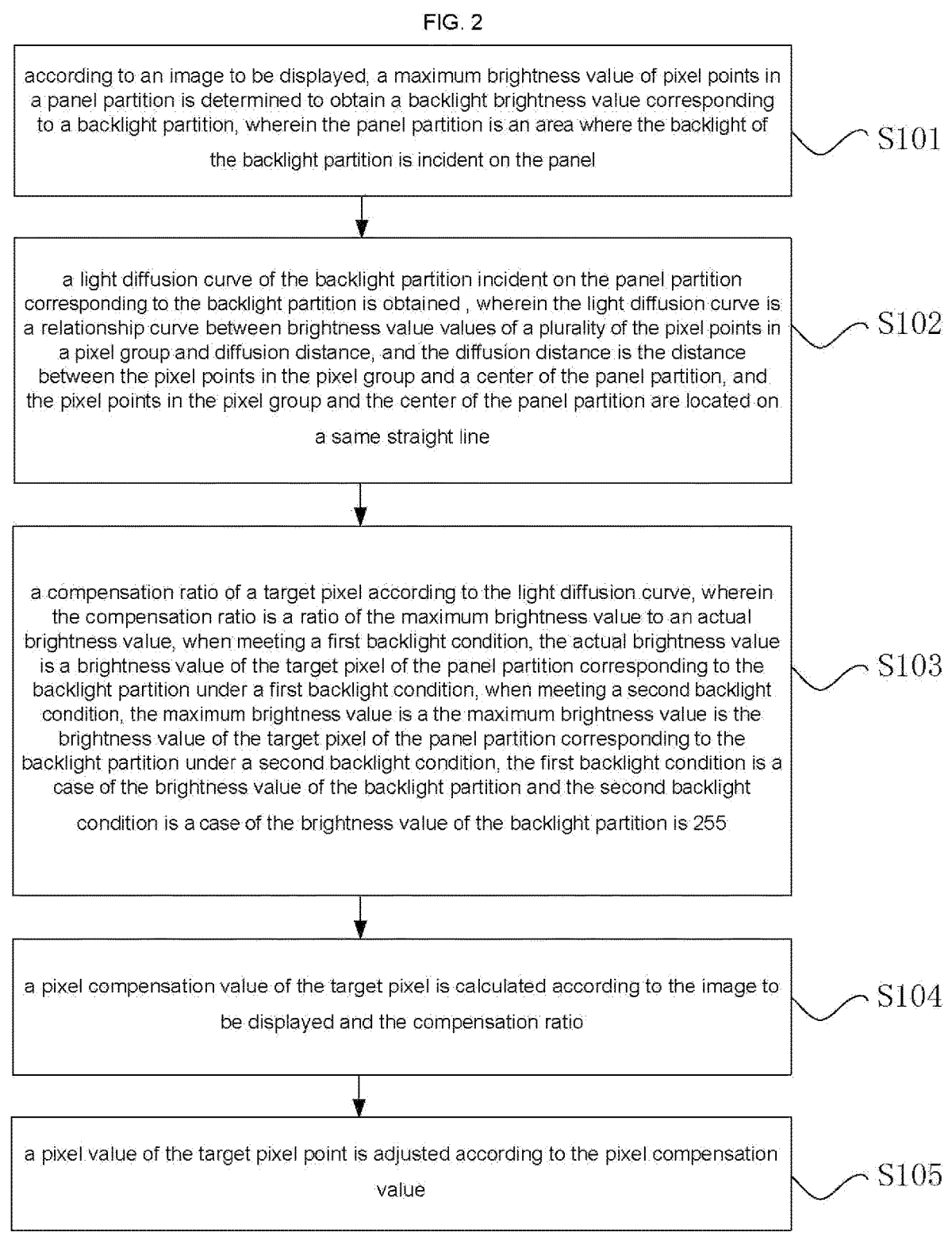

S101: according to an image to be displayed, a maximum brightness value of pixel points in a panel partition is determined to obtain a backlight brightness value corresponding to a backlight partition, wherein the panel partition is an area where the backlight of the backlight partition is incident on the panel S102: a light diffusion curve of the backlight partition incident on the panel partition corresponding to the backlight partition is obtained , wherein the light diffusion curve is a relationship curve between brightness value values of a plurality of the pixel points in a pixel group and diffusion distance, and the diffusion distance is the distance between the pixel points in the pixel group and a center of the panel partition, and the pixel points in the pixel group and the center of the panel partition are located on a same straight line S103: a compensation ratio of a target pixel according to the light diffusion curve, wherein the compensation ratio is a ratio of the maximum brightness value to an actual brightness value, when meeting a first backlight condition, the actual brightness value is a brightness value of the target pixel of the panel partition corresponding to the backlight partition under a first backlight condition, when meeting a second backlight condition, the maximum brightness value is a the maximum brightness value is the brightness value of the target pixel of the panel partition corresponding to the backlight partition under a second backlight condition, the first backlight condition is a case of the brightness value of the backlight partition and the second backlight condition is a case of the brightness value of the backlight partition is 255

S104: a pixel compensation value of the target pixel is calculated according to the image to be displayed and the compensation ratio S105: a pixel value of the target pixel point is adjusted according to the pixel compensation value

| | | | | | | |
|---|---|---|---|---|---|---|
| 3 | 2 | 2 | 2 | 2 | 2 | 3 |
| 2 | 1 | 1 | 1 | 1 | 1 | 2 |
| 2 | 1 | 1 | 1 | 1 | 1 | 2 |
| 2 | 1 | 1 | 1 | 1 | 1 | 2 |
| 2 | 1 | 1 | 1 | 1 | 1 | 2 |
| 3 | 2 | 2 | 2 | 2 | 2 | 3 |

IMAGE DISPLAY METHOD, IMAGE DISPLAY DEVICE AND DISPLAY SYSTEM

CROSS-REFERENCE TO RELATED APPLICATION

The present disclosure claims the priority of Chinese Patent Application No. 202210039285.4, filed to the China National Intellectual Property Administration on Jan. 13, 2022 and entitled "image display method, image display device, computer-readable storage medium, processor and display system", which is incorporated herein its entirety by reference.

TECHNICAL FIELD

The disclosure relates to the technical field of display, in particular to an image display method, an image display device, a computer-readable storage medium, a processor and a display system.

BACKGROUND

As shown in FIG. 1(*a*), LCD TV is composed of a constant and uniform backlight and LCD. Backlight provides a constant light source, and TFT-LCD is used as a switch to control the brightness value of corresponding pixels. Due to the light leakage of LCD, the black picture is not black enough, which inhibits the improvement of LCD TV contrast. When displaying pictures, even if some pictures are in dark state, the backlight still keeps the light source of bright pictures, resulting in waste of power consumption.

As shown in FIG. 1(*b*), local backlight adjustment uses hundreds of LEDs instead of CCFL backlight. The backlight can be adjusted according to the brightness value of the image, and the brightness value of the highlighted part in the displayed image can reach the maximum, while the dark part can be reduced or even turned off to achieve the best contrast and reduce the power consumption of the dark backlight.

In the area dynamic dimming technology of LCD, after the backlight of each area is determined, in order to ensure the brightness value and display effect after the backlight is reduced, the liquid crystal pixels need to be accurately compensated. For LED backlight, the brightness value of the light emitted by LEDs reaching the liquid crystal cell is related to the backlight structure and performance, including the power of individual LEDs, the distance between LEDs, the distance between LEDs and diffusion films, the number of diffusion films, the characteristics of diffusion films and the distance between diffusion films, etc. In order to accurately obtain the brightness value of L×K backlight subareas with different brightness value and change them into M×N precision pixel levels after light diffusion, all the above parameters must be known, but it is often difficult for the end users of liquid crystal display products to know all these parameters. Even if it is obtained, the final diffusion effect needs to be obtained by convolution and iterative calculation. Because of the huge amount of calculation, it can't be completed in the blanking period of an image at all, so it can't realize real-time video playback. If the liquid crystal pixels can not be accurately compensated, the display effect of the liquid crystal display using area dimming technology will be reduced, which will seriously affect the industrialization of this technology.

The above information disclosed in the background section is only used to enhance the understanding of the background of the technology described herein, therefore, the background may contain some information, which does not form the prior art known in China for those skilled in the art.

SUMMARY

The main purpose of the present disclosure is to provide an image display method, an image display device, a computer-readable storage medium, a processor and a display system.

According to one aspect of the embodiment of the present disclosure, an image display method is provided, which includes: according to an image to be displayed, a maximum brightness value of pixel points in a panel partition is determined, and a backlight brightness value corresponding to a backlight partition is obtained, wherein the panel partition is an area where the backlight of the backlight partition is incident on the panel, a light diffusion curve of the backlight partition incident to the panel partition corresponding to the backlight partition is obtained, wherein the light diffusion curve is the relation curve between brightness value values of a plurality of the pixel points in a pixel group and the diffusion distance, the diffusion distance is the distance between the pixel point in the pixel group and a center of the panel partition, and the pixel point in the pixel group and the center of the panel partition are on a same line, a compensation ratio of a target pixel is calculated according to the light diffusion curve, wherein the compensation ratio is a ratio of the maximum brightness value to an actual brightness value, when meeting a first backlight condition, the actual brightness value is a brightness value of the target pixel of the panel partition corresponding to the backlight partition, and when meeting a second backlight condition, the maximum brightness value is a the brightness value of the target pixel point of the panel partition corresponding to the backlight partition, the first backlight condition is a case of the brightness value of the backlight partition is the backlight brightness value, and the second backlight condition is a case of the brightness value of the backlight partition is 255; a pixel compensation value of the target pixel is calculated according to the image to be displayed and the compensation ratio; a pixel value of the target pixel is adjusted according to the pixel compensation value.

Optionally, there are two light diffusion curves, namely a first light diffusion curve and a second light diffusion curve, wherein the first light diffusion curve is the light diffusion curve corresponding to a first pixel group, the second light diffusion curve is the light diffusion curve corresponding to a second pixel group, a straight line where all pixels in the first pixel group are located is a first straight line, and a straight line where all pixels in the second pixel group are located is a second straight line, the first straight line and the second straight line are perpendicular, an intersection of the first straight line and the second straight line is the center of the panel partition, and the compensation ratio of the target pixel point is calculated according to the light diffusion curve, wherein the compensation ratio is the ratio of the maximum brightness value to the actual brightness value, includes: a plurality of auxiliary pixel points are determined according to the target pixel point, wherein the auxiliary pixel point is intersection point of a fourth straight line and a third straight line passing through the target pixel point; a center of at least one nearby panel partition is located on the third straight line; the nearby panel partition is a panel partition where the target pixel point is located and a adjacent panel partition; the third straight line is parallel to the first straight line and the fourth straight line is parallel to the second straight line; the brightness value of the auxiliary pixel is calculated according to the first light diffusion curve and a central brightness value of the nearby panel partition, wherein when the actual brightness value is obtained, the central brightness value of the nearby panel partition is the backlight brightness value of the backlight partition corresponding to the nearby panel partition, the brightness value of the auxiliary pixel is the first brightness value, when the maximum brightness value is obtained, the central brightness value of the nearby panel partition is 255, and the brightness value of the auxiliary pixel is the second brightness value; the actual brightness value is calculated according to the second light diffusion curve and the first brightness value; the maximum brightness value is calculated according to the second light diffusion curve and the second brightness value; the ratio of the maximum brightness value to the actual brightness value is calculated to obtain the compensation ratio.

Optionally, the brightness value of the auxiliary pixel is calculated according to the first light diffusion curve and the central brightness value of the nearby panel partition, includes: a first weight is determined according to the first light diffusion curve and a first distance, wherein the first distance is a distance between the auxiliary pixel and a auxiliary center, the auxiliary center is a center of the nearby panel partition on an auxiliary center line, and the auxiliary center line is the third straight line where the auxiliary pixel is located; the sum of the products of the central brightness value of a plurality of nearby panel partitions and corresponding first weights are calculated to obtain the brightness value of the auxiliary pixel.

Optionally, the actual brightness value is calculated according to the second light diffusion curve and the first brightness value, includes: a second weight is determined corresponding to each auxiliary pixel according to the second light diffusion curve and the second distance, wherein the second distance is a distance between the target pixel and the each auxiliary pixel; sum of products of the first brightness value of a plurality of the auxiliary pixel points and corresponding second weights are calculated to obtain the actual brightness value.

Optionally, according to the second light diffusion curve and the second brightness value, the maximum brightness value is calculated includes: a second weight is determined corresponding to each auxiliary pixel according to the second light diffusion curve and the second distance, wherein the second distance is a distance between the target pixel and the each auxiliary pixel; sum of products of the second brightness value of a plurality of the auxiliary pixel points and the corresponding second weights are calculated to obtain the maximum brightness value.

Optionally, the pixel compensation value of the target pixel is calculated according to the image to be displayed and the compensation ratio, includes: gamma conversion is carried out on the image to be displayed to obtain a transformed brightness value of the target pixel, wherein the transformed brightness value is a brightness value of the target pixel after the gamma conversion; the pixel compensation value is calculated according to the transformed brightness value and the compensation ratio.

Optionally, the pixel compensation value is calculated according to the transformed brightness value and the compensation ratio, includes: the product of the transformed brightness value and the compensation ratio is calculated to obtain a supplementary brightness value; the supplementary brightness value is converted into gray scale to obtain the pixel compensation value.

Optionally, a brightness value of each of the pixel points includes a red light brightness value, a green light brightness value and a blue light brightness value, wherein the backlight brightness value is a maximum value of a maximum red light brightness value, a maximum green light brightness value and a maximum blue light brightness value, and the maximum red light brightness value is a maximum value of the red light brightness value of the pixel point in the panel partition, the maximum green light brightness value is a maximum value of the green light brightness value of the pixel point in the panel partition, and the maximum blue light brightness value is a maximum of the blue light brightness value of the pixel point in the panel partition.

According to another aspect of the embodiment of the present disclosure, an image display device is also provided, which includes: a determining unit configured to determine a maximum brightness value of pixel points in a panel partition according to an image to be displayed to obtain a backlight brightness value corresponding to a backlight partition, the panel partition is an area where the backlight of the backlight partition is incident on the panel; an acquisition unit is configured to obtain a light diffusion curve of the backlight partition incident to the panel partition corresponding to the backlight partition, the light diffusion curve being a relation curve between the brightness value values of a plurality of the pixel points in a pixel group and the diffusion distance, the diffusion distance is a distance between the pixel point in the pixel group and the center of the panel partition, the pixel point in the pixel group and a center of the panel partition are on a same line, the first calculation unit is configured to calculate a compensation ratio of a target pixel according to the light diffusion curve, the compensation ratio is a ratio of the maximum brightness value to an actual brightness value, and when meeting a first backlight, the actual brightness value is a brightness value of the target pixel of the panel partition corresponding to the backlight partition, and when meeting a second backlight, the maximum brightness value is a brightness value of the target pixel of the panel partition corresponding to the backlight partition, the first backlight condition is a case of the brightness value of the backlight partition is the backlight brightness value, and the second backlight condition is a case of the brightness value of the backlight partition is 255, a second computing unit is configured to calculate a pixel compensation value of the target pixel according to the image to be displayed and the compensation ratio, and an adjusting unit is configured to adjust a pixel value of the target pixel according to the pixel compensation value.

According to another aspect of the embodiment of the present disclosure, there is also provided a computer-readable storage medium including a stored program, wherein the program executes any one of the method described above.

According to another aspect of the embodiment of the present disclosure, there is also provided a processor configured to run a program, wherein the program executes any one of the method described above.

According to another aspect of the embodiment of the present disclosure, there is also provided a display system including a display and an image display device, and the image display device is configured to execute any one of the method described above.

BRIEF DESCRIPTION OF THE DRAWINGS

The accompanying drawings of the specification, which form a part of this disclosure, are used to provide a further understanding of this disclosure. The illustrative embodiments of this disclosure and their descriptions are configured to explain this disclosure, and do not constitute undue restrictions on this disclosure. In the drawings:

FIG. 2 shows a flowchart of an image display method according to one embodiment of the present disclosure;

DETAILED DESCRIPTION OF THE EMBODIMENTS

Figure 1:
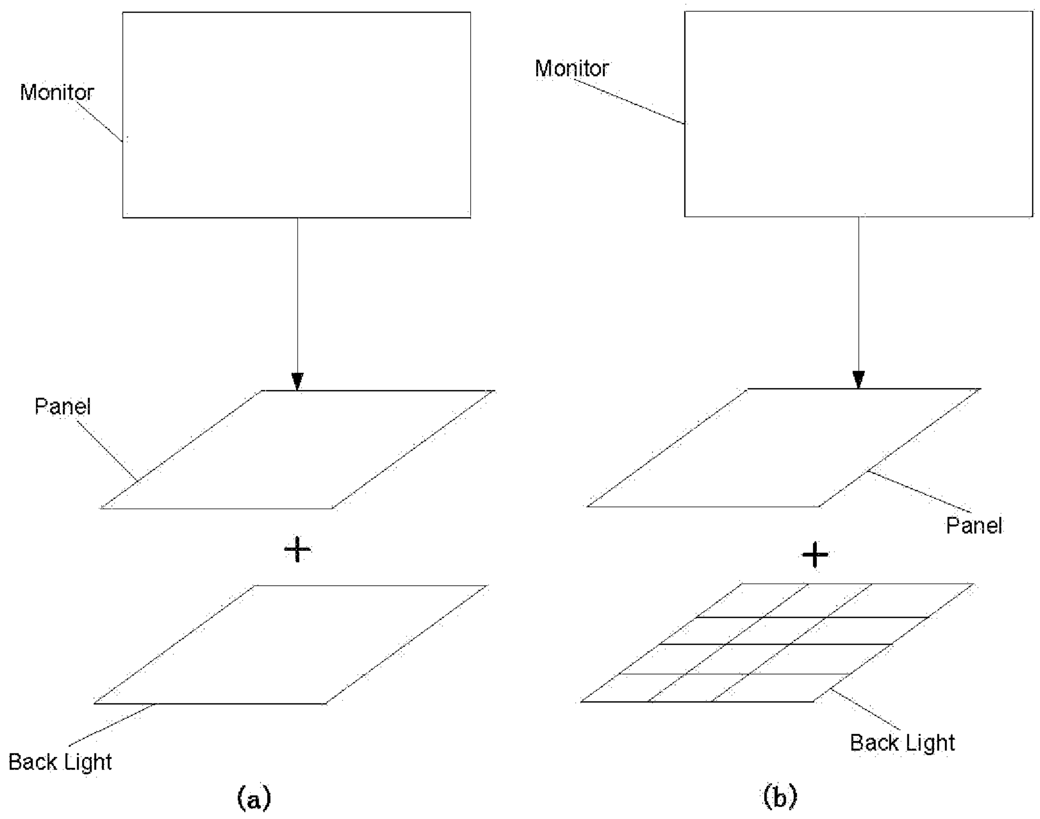
FIG. 1(*a*) and FIG. 1(*b*) respectively show schematic diagrams of the display screen of non-backlight partition and the display screen of backlight partition in the prior art.

It should be noted that the embodiments in this disclosure and the features in the embodiments can be combined with each other without conflict. The present disclosure will be described in detail with reference to the drawings and examples.

In order to make people in the technical field better understand the scheme of this disclosure, the technical scheme in the embodiments of this disclosure will be clearly and completely described with reference to the drawings in the embodiments of this disclosure. Obviously, the described embodiments are only part of the embodiments of this disclosure, not all of them. Based on the embodiments in this disclosure, all other embodiments obtained by ordinary technicians in the field without creative work should be within the scope of protection in this disclosure.

It should be noted that the terms "first", "second" and so on in the specification and claims of this disclosure and the above drawings are configured to distinguish similar objects, but not necessarily configured to describe a specific order or sequence. It should be understood that the data thus used can be interchanged under appropriate circumstances to facilitate the embodiments of the present disclosure described herein. In addition, the terms "including" and "having" and any variations thereof are intended to cover non-exclusive inclusion, for example, a process, method, system, product or equipment containing a series of steps or units need not be limited to those steps or units explicitly listed, but may include other steps or units not explicitly listed or inherent to these processes, methods, products or equipment.

It should be understood that when an element (such as a layer, film, region, or substrate) is described as being "on" another element, the element may be directly on the other element, or there may be intervening elements. Furthermore, in the specification and claims, when an element is described as being "connected" to another element, the element may be "directly connected" to the other element or "connected" to the other element through a third element.

As mentioned in the background art, the display effect of displays in the prior art is poor. In order to solve the above problems, in a typical embodiment of the present disclosure, an image display method, an image display device, a computer-readable storage medium, a processor and a display system are provided.

According to an embodiment of the present disclosure, an image display method is provided.

FIG. 2 is a flowchart of an image display method according to an embodiment of the present disclosure. As shown in FIG. 2, the method includes the following steps:

S101, according to an image to be displayed, a maximum brightness value of pixel points in a panel partition is determined to obtain a backlight brightness value corresponding to a backlight partition, wherein the panel partition is an area where the backlight of the backlight partition is incident on the panel;

S102, a light diffusion curve of the backlight partition incident on the panel partition corresponding to the backlight partition is obtained, wherein the light diffusion curve is a relationship curve between brightness value values of a plurality of the pixel points in a pixel group and diffusion distance, and the diffusion distance is the distance between the pixel points in the pixel group and a center of the panel partition, and the pixel points in the pixel group and the center of the panel partition are located on a same straight line;

S103, a compensation ratio of a target pixel according to the light diffusion curve, wherein the compensation ratio is a ratio of the maximum brightness value to an actual brightness value, when meeting a first backlight condition, the actual brightness value is a brightness value of the target pixel of the panel partition corresponding to the backlight partition, when meeting a second backlight condition, the maximum brightness value is a the maximum brightness value is the brightness value of the target pixel of the panel partition corresponding to the backlight partition, the first backlight condition is a case of the brightness value of the backlight partition and the second backlight condition is a case of the brightness value of the backlight partition is 255;

S104, a pixel compensation value of the target pixel is calculated according to the image to be displayed and the compensation ratio;

S105, a pixel value of the target pixel point is adjusted according to the pixel compensation value.

In the image display method, firstly, according to the image to be displayed, the maximum brightness value of pixels in the panel partition is determined, and the backlight brightness value corresponding to the backlight partition is obtained, wherein the backlight of the backlight partition is incident on the area covered by the panel; Then, acquiring a light diffusion curve of the backlight incident on the corresponding panel partition by the backlight partition, wherein the light diffusion curve is a relationship curve between brightness value and diffusion distance of a plurality of pixel points in a pixel group, and the diffusion distance is the distance between the pixel points in the pixel group and the center of the panel partition, and the pixel points in the pixel group and the center of the panel partition are located on the same straight line; Then, according to the light diffusion curve, the compensation ratio of the target pixel is the ratio of the maximum brightness value to the actual brightness value, the actual brightness value is the brightness value of the target pixel of the panel partition corresponding to the backlight partition under the first backlight condition, the maximum brightness value is the brightness value of the target pixel of the panel partition corresponding to the backlight partition under the second backlight condition, the brightness value of the backlight partition under the first backlight condition is the brightness value of the backlight partition, and the brightness value of the backlight partition under the second backlight condition. Then, calculating the pixel compensation value of the target pixel according to the image to be displayed and the compensation ratio; finally, adjusting the pixel value of the target pixel point according to the pixel compensation value. According to the image display method, the actual brightness value of the pixels is calculated by the light diffusion curve of the backlight partition on the display panel and the position information of the pixels, and the liquid crystal pixels are accurately compensated by combining the relationship between the backlight and the panel pixel compensation values. Compared with the prior art in which the actual brightness value of the pixels is calculated by convolution and iteration, the calculation amount is greatly reduced, the liquid crystal pixels can be accurately compensated in the blanking period of an image, block effect and halo are avoided, and the problem of poor display effect of the display in the prior art is solved.

It should be noted that the steps shown in the flowchart of the drawings can be executed in a computer system such as a set of computer-executable instructions, and although the logical sequence is shown in the flowchart, in some cases, the steps shown or described can be executed in a different order than here.

Figure 3:
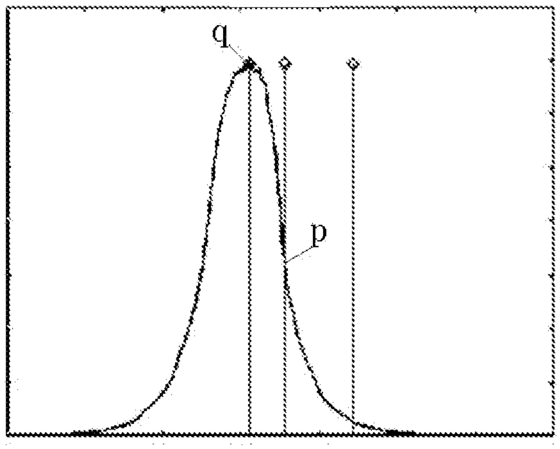
FIG. 3 shows a schematic diagram of a first light diffusion curve of one embodiment of the present disclosure.
Figure 4:
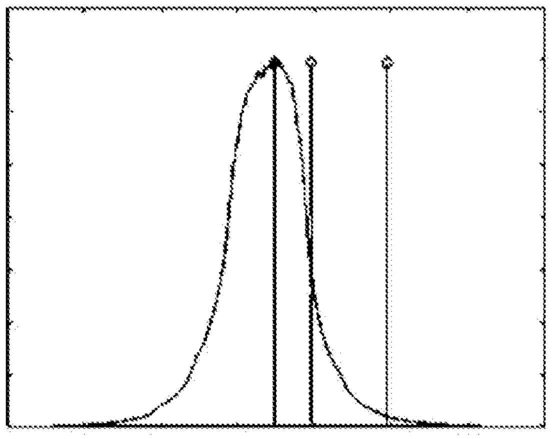
FIG. 4 shows a schematic diagram of a second light diffusion curve of one embodiment of the present disclosure.
Figures 5, 6:
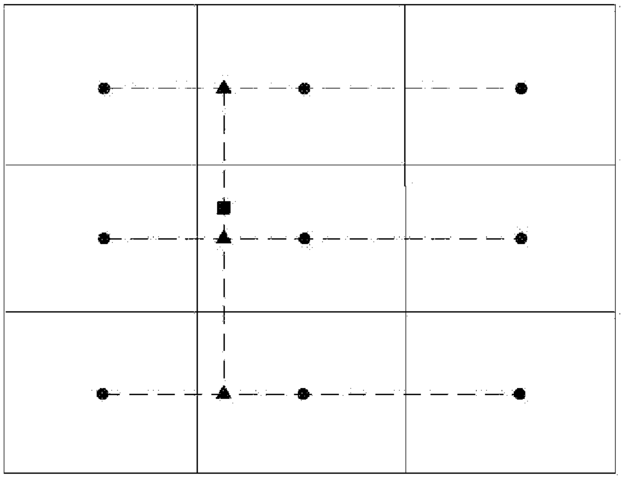
FIG. 5 shows a schematic diagram of each panel partition of a display panel according to one embodiment of the present disclosure.
FIG. 6 shows an enlarged view of the thick wireframe area in FIG. 5.

In some embodiments, there are two light diffusion curves, namely a first light diffusion curve and a second light diffusion curve. As shown in FIG. 3 and FIG. 4, the first light diffusion curve is the light diffusion curve corresponding to a first pixel group, the second light diffusion curve is the light diffusion curve corresponding to a second pixel group, and a straight line where all pixels in the first pixel group are located is a first straight line. The straight line where all pixels in the second pixel group are located is a second straight line, the first straight line is perpendicular to the second straight line, an intersection point of the first straight line and the second straight line is the center of the panel partition, and the compensation ratio of the target pixel point is calculated according to the light diffusion curve, wherein the compensation ratio is the ratio of the maximum brightness value to the actual brightness value, which includes: a plurality of auxiliary pixel points are determined according to the target pixel point, the auxiliary pixel point is the intersection point of a fourth straight line and a third straight line passing through the target pixel point, and a center of at least one nearby panel partition is located on the third straight line, and the nearby panel partition is a panel partition where the target pixel point is located and a adjacent panel partition, and the third straight line is parallel to the first straight line and the fourth straight line is parallel to the second straight line; the brightness value of the auxiliary pixel is calculated according to the first light diffusion curve and a central brightness value of the nearby panel partition, wherein when the actual brightness value is obtained, the central brightness value of the nearby panel partition is the backlight brightness value of the backlight partition corresponding to the nearby panel partition, the brightness value of the auxiliary pixel is the first brightness value, and when the maximum brightness value is obtained, the central brightness value of the nearby panel partition is 255, and the brightness value of the auxiliary pixel is the second brightness value; the actual brightness value is calculated according to the second light diffusion curve and the first brightness value; the maximum brightness value is calculated according to the second light diffusion curve and the second brightness value; the ratio of the maximum brightness value to the actual brightness value is calculated to obtain the compensation ratio. Specifically, as shown in FIG. 5, panel partitions are divided into three categories: 1, 2 and 3. The panel partition of Category 1 has the largest number of adjacent panel partitions. Take a panel partition of Category 1 as the current panel partition as an example. Corresponding to the shaded box in the figure, the thick wireframe area includes the panel partition of Category 1 and its adjacent panel partitions. The enlarged view of the thick wireframe area is shown in FIG. 6, where the square point is any pixel point of the current panel partition, that is, the target pixel point. The triangle point is the auxiliary pixel point, the circular point is the center of the panel partition, the dotted line passing through the square block is the fourth straight line, and the other three dotted lines are the third straight lines. The third straight line is parallel to the first straight line, so that the corresponding point of the auxiliary pixel point can be found on the first light diffusion curve, and the brightness value of the auxiliary pixel point can be calculated according to the brightness value of the partition center on the corresponding point and the third straight line, and the fourth straight line is parallel to the second straight line. That is, the corresponding point of the target pixel can be found on the second light diffusion curve, so that the brightness value of the target pixel can be calculated according to the brightness value of the corresponding point and the auxiliary pixel on the fourth straight line; under the condition that the central brightness value of the nearby panel partition is the backlight brightness value of the corresponding backlight partition, the brightness value of the auxiliary pixel can be calculated as the first brightness value, and the brightness value of the target pixel can be calculated as the actual brightness value. When the central brightness value of the nearby panel partition is 255, the brightness value of the auxiliary pixel is calculated as the second brightness value, the brightness value of the target pixel is calculated as the maximum brightness value, and the ratio of the maximum brightness value to the actual brightness value is calculated to obtain the compensation ratio.

In some embodiments, the brightness value of the auxiliary pixel is calculated according to the first light diffusion curve and the central brightness value of the nearby panel partition, includes: a first weight is determined according to the first light diffusion curve and a first distance, wherein the first distance is a distance between the auxiliary pixel and a auxiliary center, the auxiliary center is a center of the nearby panel partition on an auxiliary center line, and the auxiliary center line is the third straight line where the auxiliary pixel is located; a sum of products of the center brightness value of several nearby panel partitions and corresponding first weight are calculated to obtain the brightness value of the auxiliary pixel. Specifically, as shown in FIG. 3, from left to right, the abscissa of the first vertical line represents the position of the center of the current panel partition on the first straight line, the abscissa of the second vertical line represents the position of the edge of the current panel partition on the first straight line, and the abscissa of the third vertical line represents the position of the edge of the adjacent panel partition on the first straight line. Therefore, any auxiliary pixel point can be determined to find the corresponding point on the first light diffusion curve according to the first distance, which is called the first corresponding point. The corresponding point of the center of the current panel partition on the first light diffusion curve is recorded as the first central corresponding point, the brightness value of the auxiliary pixel point is the product of the brightness value of the current panel partition and the first weight, and the first weight is the ratio of the brightness value of the corresponding first corresponding point to the brightness value of the corresponding first central corresponding point. For example, as shown in FIG. 3, the auxiliary pixel point is the pixel point located on the edge of the current panel partition on the first straight line, and any corresponding point corresponding to the auxiliary pixel point is point p. The corresponding center point is point q, the first weight is the ratio of the brightness value of point p to the brightness value of point q, that is, the ratio of the ordinate of point P to the ordinate of point q, and the brightness value of the pixel point on the first line at the edge of the current panel partition is the product of the brightness value of the current panel partition and the first weight.

In some embodiments, the actual brightness value is calculated according to the second light diffusion curve and the first brightness value includes: a second weight is determined corresponding to each of the auxiliary pixels according to the second light diffusion curve and the second distance, wherein the second distance is a distance between the target pixel and the each auxiliary pixel; a sum of products of the first brightness value of a plurality of the auxiliary pixel points and corresponding second weights are calculated to obtain the actual brightness value. Specifically, as shown in FIG. 4, from left to right, the abscissa of the first vertical line represents the position of the center of the current panel partition on the second straight line, the abscissa of the second vertical line represents the position of the edge of the current panel partition on the second straight line, and the abscissa of the third vertical line represents the position of the edge of the adjacent panel partition on the second straight line. Therefore, any target pixel point can find the corresponding point on the second light diffusion curve according to the second distance, which is recorded as the second corresponding point. The corresponding point of the center of the current panel partition on the second light diffusion curve is recorded as the second center corresponding point, and the actual brightness value is the product of the first brightness value and the second weight, and the second weight is the ratio of the brightness value of the corresponding second corresponding point to the brightness value of the corresponding second center corresponding point.

In some embodiments, the maximum brightness value is calculated according to the second light diffusion curve and the second brightness value includes: a second weight is determined corresponding to each of the auxiliary pixels according to the second light diffusion curve and the second distance, wherein the second distance is a distance between the target pixel and the each auxiliary pixel; a sum of products of the second brightness value of a plurality of the auxiliary pixel points and the corresponding second weights are calculated to obtain the maximum brightness value. Specifically, as shown in FIG. 4, from left to right, the abscissa of the first vertical line represents the position of the center of the current panel partition on the second straight line, the abscissa of the second vertical line represents the position of the edge of the current panel partition on the second straight line, and the abscissa of the third vertical line represents the position of the edge of the adjacent panel partition on the second straight line. Therefore, any target pixel point can find the corresponding point on the second light diffusion curve according to the second distance, which is recorded as the second corresponding point. The corresponding point of the center of the current panel partition on the second light diffusion curve is recorded as the second center corresponding point, and the maximum brightness value is the product of the second brightness value and the second weight, and the second weight is the ratio of the brightness value of the corresponding second corresponding point to the brightness value of the corresponding second center corresponding point.

In some embodiments, the pixel compensation value of the target pixel is calculated according to the image to be displayed and the compensation ratio, includes: gamma conversion is carried out on the image to be displayed to obtain a transformed brightness value of the target pixel, wherein the transformed brightness value is a brightness value of the target pixel after the gamma transformation; the pixel compensation value is calculated according to the transformed brightness value and the compensation ratio. Specifically, if the image to be displayed is a gray-scale image, the gray-scale image is subjected to gamma conversion to obtain the transformed brightness value of the target pixel, and the transformed brightness value and the compensation ratio are calculated and converted into the pixel compensation value.

In some embodiments, the pixel compensation value is calculated according to the transformed brightness value and the compensation ratio, includes: the product of the transformed brightness value and the compensation ratio is calculated to obtain a supplementary brightness value; the supplementary brightness value is converted into gray scale to obtain the pixel compensation value. Specifically, the product of the transformed brightness value and the compensation ratio is calculated to obtain the supplementary brightness value, and the supplementary brightness value is converted into gray scale to obtain the pixel compensation value, which is convenient for pixel compensation of gray scale images, and the calculation process is simple and does not affect the display effect.

In some embodiments, a brightness value of each of the pixel points includes a red light brightness value, a green light brightness value and a blue light brightness value. The backlight brightness value is a maximum of a maximum red light brightness value, a maximum green light brightness value and a maximum blue light brightness value. The maximum red light brightness value is a maximum of the red light brightness value of the pixel point in the panel partition, the maximum green light brightness value is a maximum value of the green light brightness value of the pixel point in the panel partition, and the maximum blue light brightness value is a maximum of the blue light brightness value of the pixel point in the panel partition. Specifically, the maximum brightness value required for image display is determined according to the red brightness value, green brightness value and blue brightness value of any pixel point, so as to ensure the display effect of the current panel partition and avoid the image of the current panel partition from being too dark.

The disclosed embodiment also provides an image display device. It should be noted that the image display device of the disclosed embodiment can be configured to execute the configured image display method provided by the disclosed embodiment. The following describes the image display device provided by the embodiment of the present disclosure.

Figure 7:
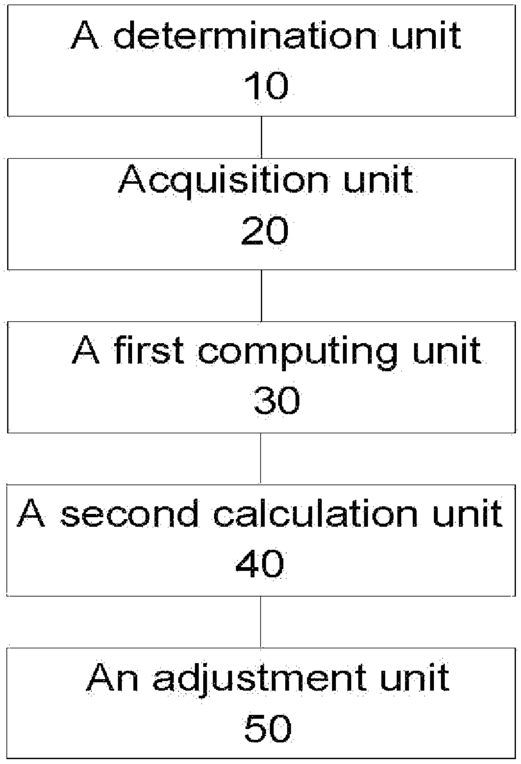
FIG. 7 shows a schematic diagram of an image display device according to one embodiment of the present disclosure.

FIG. 7 is a schematic diagram of an image display device according to an embodiment of the present disclosure. As shown in FIG. 7, the device includes:

the determining unit 10 is configured to determine a maximum brightness value of pixels points in a panel partition according to an image to be displayed to obtain a backlight brightness value corresponding to a backlight partition, wherein the panel partition is an area where the backlight of the backlight partition is incident on the panel;

the acquisition unit 20 is configured to acquire the light diffusion curve of the backlight of the backlight partition incident on the panel partition corresponding to the backlight partition, wherein the light diffusion curve is the relationship curve between the brightness value values of a plurality of the pixel points in a pixel group and the diffusion distance, the diffusion distance is a distance between the pixel point in the pixel group and the center of the panel partition, and the pixel points in the pixel group and a center of the panel partition are located on a same straight line;

the first calculation unit 30 is configured to calculate a compensation ratio of a target pixel according to the light diffusion curve, the compensation ratio is a ratio of the maximum brightness value to an actual brightness value, when meeting a first backlight, the actual brightness value is a brightness value of the target pixel of the panel partition corresponding to the backlight partition, and when meeting a second backlight, the maximum brightness value is a brightness value of the target pixel of the panel partition corresponding to the backlight partition, the first backlight case is the case where the brightness value of the backlight zone is the brightness value of the backlight zone, and the second backlight condition is the case where the brightness value of the backlight zone is 255;

a second calculation unit 40 is configured to calculate a pixel compensation value of the target pixel according to the image to be displayed and the compensation ratio;

an adjusting unit 50 is configured to adjust a pixel value of the target pixel point according to the pixel compensation value.

In the image display device, the determining unit determines the maximum brightness value of the pixels in the panel partition according to the image to be displayed, and obtains the backlight brightness value of the corresponding backlight partition. The panel partition is the backlight incident area of the backlight zone to the panel coverage area. The acquisition unit acquires the backlight diffusion curve of the backlight partition incident to the corresponding panel partition, and the light diffusion curve is the relation curve between the brightness value and the diffusion distance of a plurality of the pixel points in the pixel group. The diffusion distance is the distance between the pixel points in the pixel group and the center of the panel partition, and the pixel points in the pixel group are on the same line as the center of the panel partition. The first calculation unit calculates the compensation ratio of the target pixel according to the light diffusion curve, the compensation ratio is the ratio of the maximum brightness value to the actual brightness value, when the actual brightness value is the first backlight, the brightness value of the target pixel of the panel partition corresponding to the backlight zone, and the brightness value of the target pixel of the panel partition corresponding to the backlight zone when the maximum brightness value is the second backlight. The first backlight condition is that the brightness value of the backlight zone is the brightness value of the backlight zone, and the second backlight condition is the case where the brightness value of the backlight zone is 255. The second calculation unit calculates the pixel compensation value of the target pixel point according to the image to be displayed and the compensation ratio; the adjusting unit adjusts the pixel value of the target pixel point according to the pixel compensation value. The image display device calculates the actual brightness value of the pixel point through the light diffusion curve of the backlight partition on the display panel and the position information of the pixel point, and compensates the liquid crystal pixel accurately by combining the relationship between the backlight and the panel pixel compensation value. Compared with the existing technology to calculate the actual brightness value of pixels by convolution and iteration, the amount of calculation is greatly reduced. The liquid crystal pixel can be compensated accurately in the vanishing period of an image, which avoids the block effect and halo of the screen, and solves the problem of poor display effect of the display in the prior art.

In some embodiments, there are two light diffusion curves, namely a first light diffusion curve and a second light diffusion curve. As shown in FIG. 3 and FIG. 4, the first light diffusion curve is the light diffusion curve corresponding to a first pixel group, the second light diffusion curve is the light diffusion curve corresponding to a second pixel group, and a straight line where all pixels in the first pixel group are located is a first straight line. The straight line where all pixels in the second pixel group are located is a second straight line, the first straight line is perpendicular to the second straight line, and an intersection of the first straight line and the second straight line is the center of the panel partition. The first calculation unit includes a determination module, a first calculation module, a second calculation module, a third calculation module and a fourth calculation module, wherein the determination module is configured to determine a plurality of auxiliary pixel points according to the target pixel points, the auxiliary pixel point is the intersection point of a fourth straight line and a third straight line passing through the target pixel point, and a center of at least one nearby panel partition is located on the third straight line, and the nearby panel partition is a panel partition where the target pixel point is located and a adjacent panel partition, and the third straight line is parallel to the first straight line and the fourth straight line is parallel to the second straight line; the first calculation module is configured to calculate the brightness value of the auxiliary pixel according to the first light diffusion curve and a central brightness value of the nearby panel partition. When obtaining the actual brightness value, the central brightness value of the nearby panel partition is the backlight brightness value of the backlight partition corresponding to the nearby panel partition, the brightness value of the auxiliary pixel is the first brightness value, and when obtaining the maximum brightness value, the central brightness value of the nearby panel partition is 255, and the brightness value of the auxiliary pixel is the second brightness value. The second calculation module is configured to calculate the actual brightness value according to the second light diffusion curve and the first brightness value; The third calculation module is configured to calculate the maximum brightness value according to the second light diffusion curve and the second brightness value; The fourth calculation module is configured to calculate the ratio of the maximum brightness value to the actual brightness value to obtain the compensation ratio. Specifically, as shown in FIG. 5, panel partitions are divided into three categories: 1, 2 and 3. The panel partition of Category 1 has the largest number of adjacent panel partitions. Take a panel partition of Category 1 as the current panel partition as an example. Corresponding to the shaded box in the figure, the thick wireframe area includes the panel partition of Category 1 and its adjacent panel partitions. The enlarged view of the thick wireframe area is shown in FIG. 6, where the square point is any pixel point of the current panel partition, that is, the target pixel point. The triangle point is the auxiliary pixel point, the circular point is the center of the panel partition, the dotted line passing through the square block is the fourth straight line, and the other three dotted lines are the third straight lines. The third straight line is parallel to the first straight line, so that the corresponding point of the auxiliary pixel point can be found on the first light diffusion curve, and the brightness value of the auxiliary pixel point can be calculated according to the brightness value of the partition center on the corresponding point and the third straight line, and the fourth straight line is parallel to the second straight line. That is, the corresponding point of the target pixel can be found on the second light diffusion curve, so that the brightness value of the target pixel can be calculated according to the brightness value of the corresponding point and the auxiliary pixel on the fourth straight line; under the condition that the central brightness value of the nearby panel partition is the backlight brightness value of the corresponding backlight partition, the brightness value of the auxiliary pixel can be calculated as the first brightness value, and the brightness value of the target pixel can be calculated as the actual brightness value. When the central brightness value of the nearby panel partition is 255, the brightness value of the auxiliary pixel is calculated as the second brightness value, the brightness value of the target pixel is calculated as the maximum brightness value, and the ratio of the maximum brightness value to the actual brightness value is calculated to obtain the compensation ratio.

In some embodiments, the first calculation module includes a first determination sub-module and a first operator module, wherein the first determination sub-module is configured to determine a first weight according to the first light diffusion curve and a first distance, wherein the first distance is a distance between the auxiliary pixel point and the auxiliary center, the auxiliary center is the center of the nearby panel partition on an auxiliary center line, and the auxiliary center line is the third straight line where the auxiliary pixel point is located; The first operator module is configured to calculate a sum of products of the center brightness value of several nearby panel partitions and corresponding first weights to obtain the brightness value of the auxiliary pixels. Specifically, as shown in FIG. 3, from left to right, the abscissa of the first vertical line represents the position of the center of the current panel partition on the first straight line, the abscissa of the second vertical line represents the position of the edge of the current panel partition on the first straight line, and the abscissa of the third vertical line represents the position of the edge of the adjacent panel partition on the first straight line. Therefore, any auxiliary pixel point can be determined to find the corresponding point on the first light diffusion curve according to the first distance, which is called the first corresponding point. The corresponding point of the center of the current panel partition on the first light diffusion curve is recorded as the first central corresponding point, the brightness value of the auxiliary pixel point is the product of the brightness value of the current panel partition and the first weight, and the first weight is the ratio of the brightness value of the corresponding first corresponding point to the brightness value of the corresponding first central corresponding point. For example, as shown in FIG. 3, the auxiliary pixel point is the pixel point located on the edge of the current panel partition on the first straight line, and any corresponding point corresponding to the auxiliary pixel point is point p. The corresponding center point is point q, the first weight is the ratio of the brightness value of point P to the brightness value of point q, that is, the ratio of the ordinate of point p to the ordinate of point q, and the brightness value of the pixel point on the first line at the edge of the current panel partition is the product of the brightness value of the current panel partition and the first weight.

In some embodiments, the second calculation module includes a second determination sub-module and a second calculation sub-module, wherein the second determination sub-module is configured to determine a second weight corresponding to each of the auxiliary pixels according to the second light diffusion curve and a second distance, wherein the second distance is a distance between the target pixel and the auxiliary pixel; The second calculation sub-module is configured to calculate a sum of products of the first brightness value of a plurality of the auxiliary pixel points and corresponding second weight to obtain the actual brightness value. Specifically, as shown in FIG. 4, from left to right, the abscissa of the first vertical line represents the position of the center of the current panel partition on the second straight line, the abscissa of the second vertical line represents the position of the edge of the current panel partition on the second straight line, and the abscissa of the third vertical line represents the position of the edge of the adjacent panel partition on the second straight line. Therefore, any target pixel point can find the corresponding point on the second light diffusion curve according to the second distance, which is recorded as the second corresponding point. The corresponding point of the center of the current panel partition on the second light diffusion curve is recorded as the second center corresponding point, and the actual brightness value is the product of the first brightness value and the second weight, and the second weight is the ratio of the brightness value of the corresponding second corresponding point to the brightness value of the corresponding second center corresponding point.

In some embodiments, the third calculation module includes a third determination sub-module and a third calculation sub-module, wherein the third determination sub-module is configured to determine a second weight corresponding to each of the auxiliary pixels according to the second light diffusion curve and the second distance, wherein the second distance is a distance between the target pixel and the each auxiliary pixel; The third calculation submodule is configured to calculate a sum of products of the second brightness value of the plurality of the auxiliary pixel points and the corresponding second weights to obtain the maximum brightness value. Specifically, as shown in FIG. 4, from left to right, the abscissa of the first vertical line represents the position of the center of the current panel partition on the second straight line, the abscissa of the second vertical line represents the position of the edge of the current panel partition on the second straight line, and the abscissa of the third vertical line represents the position of the edge of the adjacent panel partition on the second straight line. Therefore, any target pixel point can find the corresponding point on the second light diffusion curve according to the second distance, which is recorded as the second corresponding point. The corresponding point of the center of the current panel partition on the second light diffusion curve is recorded as the second center corresponding point, and the maximum brightness value is the product of the second brightness value and the second weight, and the second weight is the ratio of the brightness value of the corresponding second corresponding point to the brightness value of the corresponding second center corresponding point.

In some embodiments, the second computing unit includes a processing module and a fifth computing module, wherein the processing module is configured to carry out gamma conversion on the image to be displayed to obtain a transformed brightness value of the target pixel, and the transformed brightness value is a brightness value of the target pixel after the gamma conversion; The fifth calculation module is configured to calculate the pixel compensation value according to the transformed brightness value and the compensation ratio. Specifically, if the image to be displayed is a gray-scale image, the gray-scale image is subjected to gamma conversion to obtain the transformed brightness value of the target pixel, and the transformed brightness value and the compensation ratio are calculated and converted into the pixel compensation value.

In some embodiments, the fifth calculation module includes a fourth calculation sub-module and a processing sub-module, wherein the fourth calculation sub-module is configured to calculate the product of the transformed brightness value and the compensation ratio to obtain a supplementary brightness value; the processing sub-module is configured to convert the supplementary brightness value into gray scale to obtain the pixel compensation value. Specifically, the product of the transformed brightness value and the compensation ratio is calculated to obtain the supplementary brightness value, and the supplementary brightness value is converted into gray scale to obtain the pixel compensation value, which is convenient for pixel compensation of gray scale images, and the calculation process is simple and does not affect the display effect.

In some embodiments, a brightness value of each of the pixel points includes a red light brightness value, a green light brightness value and a blue light brightness value. The backlight brightness value is a maximum of a maximum red light brightness value, a maximum green light brightness value and a maximum blue light brightness value. The maximum red light brightness value is a maximum of the red light brightness value of the pixel point in the panel partition, the maximum green light brightness value is a maximum value of the green light brightness value of the pixel point in the panel partition, and the maximum blue light brightness value is a maximum of the blue light brightness value of the pixel point in the panel partition. Specifically, the maximum brightness value required for image display is determined according to the red brightness value, green brightness value and blue brightness value of any pixel point, so as to ensure the display effect of the current panel partition and avoid the image of the current panel partition from being too dark.

The disclosed embodiment also provides a display system, which includes a display and an image display device, and the image display device is configured to execute any one of the above methods.

The display system includes a display and an image display device. According to the image to be displayed, the determining unit determines the maximum brightness value of the pixels in the panel partition and obtains the backlight brightness value of the corresponding backlight partition. The panel partition is the backlight incident area of the backlight zone to the panel cover area. The acquisition unit acquires the backlight diffusion curve of the backlight partition incident to the corresponding panel partition, and the light diffusion curve is the relation curve between the brightness value and the diffusion distance of a plurality of the pixel points in the pixel group. The diffusion distance is the distance between the pixel points in the pixel group and the center of the panel partition, and the pixel points in the pixel group are on the same line as the center of the panel partition. The first calculation unit calculates the compensation ratio of the target pixel according to the light diffusion curve, the compensation ratio is the ratio of the maximum brightness value to the actual brightness value, when the actual brightness value is the first backlight, the brightness value of the target pixel of the panel partition corresponding to the backlight zone, and the brightness value of the target pixel of the panel partition corresponding to the backlight zone when the maximum brightness value is the second backlight. The first backlight condition is that the brightness value of the backlight zone is the brightness value of the backlight zone, and the second backlight condition is the case where the brightness value of the backlight zone is 255. The second calculation unit calculates the pixel compensation value of the target pixel point according to the image to be displayed and the compensation ratio; the adjusting unit adjusts the pixel value of the target pixel point according to the pixel compensation value. The image display device calculates the actual brightness value of the pixel point through the light diffusion curve of the backlight partition on the display panel and the position information of the pixel point, and compensates the liquid crystal pixel accurately by combining the relationship between the backlight and the panel pixel compensation value. Compared with the existing technology to calculate the actual brightness value of pixels by convolution and iteration, the amount of calculation is greatly reduced. The liquid crystal pixel can be compensated accurately in the vanishing period of an image, which avoids the block effect and halo of the screen, and solves the problem of poor display effect of the display in the prior art.

The image display device includes a processor and a memory. The determination unit, the acquisition unit, the first calculation unit, the second calculation unit and the adjustment unit are stored in the memory as program units, and the processor executes the program units stored in the memory to realize corresponding functions.

The processor contains a kernel, and the kernel goes to the memory to retrieve the corresponding program unit. One or more kernels can be set, and the problem of poor display effect of the display in the prior art can be solved by adjusting kernel parameters.

The memory may include non-permanent memory, random access memory (RAM) and non-volatile memory in computer-readable media, such as read-only memory (ROM) or flash RAM, and the memory includes at least one memory chip.

The disclosed embodiment provides a computer-readable storage medium on which a program is stored, which when executed by a processor realizes the above method.

The disclosed embodiment provides a processor configured to run a program, wherein the program executes the method.

The disclosed embodiment provides a device, which comprises a processor, a memory and a program stored in the memory and running on the processor. When the processor executes the program, it realizes at least the following steps:

S101, according to an image to be displayed, a maximum brightness value of pixels in a panel partition is determined to obtain a backlight brightness value corresponding to a backlight partition, wherein the panel partition is an area where the backlight of the backlight partitions are incident on the panel;

S102, a light diffusion curve of the backlight partition incident on the panel partition corresponding to the backlight partition is obtained, wherein the light diffusion curve is a relationship curve between brightness value values of a plurality of the pixel points in a pixel group and diffusion distance, and the diffusion distance is the distance between the pixel points in the pixel group and a center of the panel partition, and the pixel points in the pixel group and the center of the panel partition are located on a same straight line;

S103, a compensation ratio of a target pixel according to the light diffusion curve, wherein the compensation ratio is a ratio of the maximum brightness value to an actual brightness value, when meeting a first backlight condition, the actual brightness value is a brightness value of the target pixel of the panel partition corresponding to the backlight partition, when meeting a second backlight condition, the maximum brightness value is a maximum brightness value is the brightness value of the target pixel of the panel partition corresponding to the backlight partition, the first backlight condition is a case of the brightness value of the backlight partition and the second backlight condition is a case of the brightness value of the backlight partition is 255.

S104, a pixel compensation value of the target pixel is calculated according to the image to be displayed and the compensation ratio;

S105, a pixel value of the target pixel point is adjusted according to the pixel compensation value.

The devices in this paper can be servers, PC, PAD, cell phones, etc.

The present disclosure also provides a computer program product which, when executed on a data processing device, is suitable for executing a program initialized with at least the following method steps:

S101, according to an image to be displayed, a maximum brightness value of pixel points in a panel partition is determined to obtain a backlight brightness value corresponding to a backlight partition, wherein the panel partition is an area where the backlight of the backlight partitions are incident on the panel;

S102, a light diffusion curve of the backlight partition incident on the panel partition corresponding to the backlight partition is obtained, wherein the light diffusion curve is a relationship curve between brightness value values of a plurality of the pixel points in a pixel group and diffusion distance, and the diffusion distance is the distance between the pixel points in the pixel group and a center of the panel partition, and the pixel points in the pixel group and the center of the panel partition are located on a same straight line;

S103, a compensation ratio of a target pixel according to the light diffusion curve, wherein the compensation ratio is a ratio of the maximum brightness value to an actual brightness value, when meeting a first backlight condition, the actual brightness value is a brightness value of the target pixel of the panel partition corresponding to the backlight partition, when meeting a second backlight condition, the maximum brightness value is a maximum brightness value is the brightness value of the target pixel of the panel partition corresponding to the backlight partition, the first backlight condition is a case of the brightness value of the backlight partition and the second backlight condition is a case of the brightness value of the backlight partition is 255.

S104, a pixel compensation value of the target pixel is calculated according to the image to be displayed and the compensation ratio;

S105, a pixel value of the target pixel point is adjusted according to the pixel compensation value.

In the above-mentioned embodiments of the disclosure, the descriptions of each embodiment have their own emphasis. For the parts that are not detailed in one embodiment, please refer to the related descriptions of other embodiments.

In several embodiments provided by this disclosure, it should be understood that the disclosed technical content can be realized in other ways. Among them, the device embodiments described above are only schematic, for example, the division of the above units can be a logical function division, and there can be other division modes in actual implementation, for example, multiple units or components can be combined or integrated into another system, or some features can be ignored or not implemented. On the other hand, the mutual coupling or direct coupling or communication connection shown or discussed may be indirect coupling or communication connection through some interfaces, units or modules, and may be in electrical or other forms.

The units described above as separated components may or may not be physically separated, and the components displayed as units may or may not be physical units, that is, they may be located in one place or distributed among multiple units. Some or all units can be selected according to actual needs to achieve the purpose of this embodiment.

In addition, each functional unit in each embodiment of the present disclosure can be integrated in one processing unit, each unit can physically exist separately, or two or more units can be integrated in one unit. The above-mentioned integrated units can be implemented in the form of hardware or software functional units.

The above-mentioned integrated units can be stored in a computer-readable storage medium if they are realized in the form of software functional units and sold or used as independent products. Based on this understanding, the technical solution of the present disclosure can be embodied in the form of a software product, which is stored in a computer-readable storage medium and includes several instructions to make a computer device (which can be a personal computer, a server or a network device, etc.) perform all or part of the steps of the above methods of various embodiments of the present disclosure. The aforementioned computer-readable storage media include: U disk, Read-Only Memory (ROM), Random Access Memory (RAM), removable hard disk, magnetic disk or optical disk and other media that can store program codes.

From the above description, it can be seen that the above embodiments of the present disclosure have achieved the following technical effects:

1). in the image display method of the present disclosure, firstly, according to the image to be displayed, the maximum brightness value of the pixels in the panel partition is determined, and the backlight brightness value of the corresponding backlight partition is obtained. The panel partition is the backlight incident to the area covered by the backlight zone. Then, the light diffusion curve of the backlight incident to the corresponding panel partition is obtained, and the light diffusion curve is the relation curve between the brightness value and the diffusion distance of a plurality of the pixel points in the pixel group. The diffusion distance is the distance between the pixel points in the pixel group and the center of the panel partition, and the pixel points in the pixel group are on the same line as the center of the panel partition. After that, the compensation ratio of the target pixel is calculated according to the light diffusion curve, and the compensation ratio is the ratio of the maximum brightness value to the actual brightness value, and when the actual brightness value is the first backlight, the brightness value of the target pixel of the panel partition corresponding to the backlight zone is the brightness value of the target pixel point of the panel partition corresponding to the second backlight zone, and the brightness value of the target pixel point of the panel partition corresponding to the backlight zone is the brightness value of the target pixel point of the panel partition corresponding to the backlight zone. The first backlight condition is that the brightness value of the backlight zone is the brightness value of the backlight zone, and the second backlight condition is the case where the brightness value of the backlight zone is 255. Then, the pixel compensation value of the target pixel is calculated according to the image to be displayed and the compensation ratio; finally, the pixel value of the target pixel is adjusted according to the pixel compensation value. The image display method calculates the actual brightness value of the pixel through the light diffusion curve of the backlight partition on the display panel and the position information of the pixel point, and compensates the liquid crystal pixel accurately by combining the relationship between the backlight and the pixel compensation value of the panel. Compared with the existing technology to calculate the actual brightness value of pixels by convolution and iteration, the amount of calculation is greatly reduced. The liquid crystal pixel can be compensated accurately in the vanishing period of an image, which avoids the block effect and halo of the screen, and solves the problem of poor display effect of the display in the prior art.

2). in the image display device of the present disclosure, the determining unit determines the maximum brightness value of the pixels in the panel partition according to the image to be displayed, and obtains the backlight brightness value of the corresponding backlight partition. The panel partition is that the backlight of the backlight zone is incident to the area covered by the panel. The acquisition unit acquires the backlight diffusion curve of the backlight partition incident to the corresponding panel partition, and the light diffusion curve is the relation curve between the brightness value and the diffusion distance of a plurality of the pixel points in the pixel group. The diffusion distance is the distance between the pixel points in the pixel group and the center of the panel partition, and the pixel points in the pixel group are on the same line as the center of the panel partition. The first calculation unit calculates the compensation ratio of the target pixel according to the light diffusion curve, the compensation ratio is the ratio of the maximum brightness value to the actual brightness value, when the actual brightness value is the first backlight, the brightness value of the target pixel of the panel partition corresponding to the backlight zone, and the brightness value of the target pixel of the panel partition corresponding to the backlight zone when the maximum brightness value is the second backlight. The first backlight condition is that the brightness value of the backlight zone is the brightness value of the backlight zone, and the second backlight condition is the case where the brightness value of the backlight zone is 255. The second calculation unit calculates the pixel compensation value of the target pixel point according to the image to be displayed and the compensation ratio; the adjusting unit adjusts the pixel value of the target pixel point according to the pixel compensation value. The image display device calculates the actual brightness value of the pixel point through the light diffusion curve of the backlight partition on the display panel and the position information of the pixel point, and compensates the liquid crystal pixel accurately by combining the relationship between the backlight and the panel pixel compensation value. Compared with the existing technology to calculate the actual brightness value of pixels by convolution and iteration, the amount of calculation is greatly reduced. The liquid crystal pixel can be compensated accurately in the vanishing period of an image, which avoids the block effect and halo of the screen, and solves the problem of poor display effect of the display in the prior art.

3) The display system of the present disclosure includes a display and an image display device. The determination unit determines the maximum brightness value of pixels in a panel partition according to the image to be displayed, and obtains the backlight brightness value corresponding to the backlight partition, wherein the panel partition is the area where the backlight of the backlight partition is incident on the panel; The unit acquires the light diffusion curve of the backlight incident on the corresponding panel partition by the backlight partition, wherein the light diffusion curve is the relationship curve between brightness value and diffusion distance of a plurality of pixel points in the pixel group, and the diffusion distance is the distance between the pixel points in the pixel group and the center of the panel partition, and the pixel points in the pixel group and the center of the panel partition are located on the same straight line; A first calculation unit calculates the compensation ratio of the target pixel according to the light diffusion curve, wherein the compensation ratio is the ratio of the maximum brightness value to the actual brightness value, the actual brightness value is the brightness value of the target pixel of the panel partition corresponding to the backlight partition under the first backlight condition, the maximum brightness value is the brightness value of the target pixel of the panel partition corresponding to the backlight partition under the second backlight condition, the first backlight condition is the brightness value of the backlight partition and the second backlight condition is the brightness value 255 of the backlight partition. A second calculation unit calculates the pixel compensation value of the target pixel according to the image to be displayed and the compensation ratio; the adjusting unit adjusts the pixel value of the target pixel point according to the pixel compensation value. According to the image display device, the actual brightness value of pixel points is calculated by the light diffusion curve of the backlight partition on the display panel and the position information of pixel points, and the liquid crystal pixels are accurately compensated by combining the relationship between backlight and panel pixel compensation values. Compared with the prior art, when the actual brightness value of pixel points is calculated by convolution and iteration, the calculation amount is greatly reduced, the liquid crystal pixels can be accurately compensated in the blanking period of an image, block effect and halo are avoided, and the problem of poor display effect of the display in the prior art is solved.

What has been described above is only the preferred embodiment of the present disclosure, and it is not configured to limit the present disclosure, which can be modified and varied by those skilled in the art. Any modification, equivalent replacement, improvement, etc. made within the spirit and principle of this disclosure should be included in the scope of protection of this disclosure.

What is claimed is:

1. An image display method, comprising:

according to an image to be displayed, determining a maximum brightness value of pixel points in a panel partition to obtain a backlight brightness value corresponding to a backlight partition, wherein the panel partition is area where the backlight of the backlight partition is incident on the panel;

acquiring a light diffusion curve of the backlight of the backlight partition incident on the panel partition corresponding to the backlight partition, wherein the light diffusion curve is a relationship curve between brightness value values of a plurality of the pixel points in a pixel group and diffusion distance, and the diffusion distance is the distance between the pixel point in the pixel group and a center of the panel partition, and the pixel point in the pixel group and the center of the panel partition are located on a same straight line;

calculating a compensation ratio of a target pixel according to the light diffusion curve, wherein the compensation ratio is a ratio of the maximum brightness value to an actual brightness value, when meeting a first backlight condition, the actual brightness value is a brightness value of the target pixel of the panel partition corresponding to the backlight partition, and when meeting a second backlight condition, the maximum brightness value is a brightness value of the target pixel point of the panel partition corresponding to the backlight partition, the first backlight condition is a case of the brightness value of the backlight partition is the backlight brightness value, and the second backlight condition is a case of the brightness value of the backlight partition is 255;

calculating a pixel compensation value of the target pixel according to the image to be displayed and the compensation ratio;

adjusting a pixel value of the target pixel point according to the pixel compensation value.

2. The method according to claim 1, wherein there are two light diffusion curves, namely a first light diffusion curve and a second light diffusion curve, the first light diffusion curve is the light diffusion curve corresponding to a first pixel group, and a second light diffusion curve is the light diffusion curve corresponding to the second pixel group; a straight line where all pixels in the first pixel group are located is a first straight line, and a straight line where all pixels in the second pixel group are located is a second straight line, the first straight line and the second straight line are perpendicular, and an intersection of the first straight line and the second straight line is the center of the panel partition, according to the light diffusion curve, calculating the compensation ratio of the target pixel, wherein the compensation ratio is the ratio of the maximum brightness value to the actual brightness value, comprises:

determining a plurality of auxiliary pixel points according to the target pixel point, wherein the auxiliary pixel point is intersection point of a fourth straight line and a third straight line passing through the target pixel point; a center of at least one nearby panel partition is located on the third straight line; the nearby panel partition is a panel partition where the target pixel point is located and a adjacent panel partition; the third straight line is parallel to the first straight line and the fourth straight line is parallel to the second straight line;

calculating a brightness value of the auxiliary pixel according to the first light diffusion curve and a central brightness value of the nearby panel partition, wherein when the actual brightness value is obtained, the central brightness value of the nearby panel partition is the backlight brightness value of the backlight partition corresponding to the nearby panel partition, the brightness value of the auxiliary pixel is the first brightness value, when the maximum brightness value is obtained, the central brightness value of the nearby panel partition is 255, and the brightness value of the auxiliary pixel is the second brightness value;

calculating the actual brightness value according to the second light diffusion curve and the first brightness value;

calculating the maximum brightness value according to the second light diffusion curve and the second brightness value;

calculating the ratio of the maximum brightness value to the actual brightness value to obtain the compensation ratio.

3. The method according to claim 2, wherein calculating the brightness value of the auxiliary pixel point according to the first light diffusion curve and the central brightness value of the nearby panel partition comprises:

determining a first weight according to the first light diffusion curve and a first distance, wherein the first distance is a distance between the auxiliary pixel point and a auxiliary center, the auxiliary center is a center of the nearby panel partition on an auxiliary center line, and the auxiliary center line is the third straight line where the auxiliary pixel point is located;

calculating a sum of products of the central brightness value of a plurality of nearby panel partitions and corresponding first weights to obtain the brightness value of the auxiliary pixel.

4. The method according to claim 2, wherein calculating the actual brightness value according to the second light diffusion curve and the first brightness value comprises:

determining a second weight corresponding to each auxiliary pixel according to the second light diffusion curve and a second distance, wherein the second distance is a distance between the target pixel and the each auxiliary pixel;

calculating a sum of products of the first brightness value of a plurality of the auxiliary pixel points and corresponding second weights to obtain the actual brightness value.

5. The method according to claim 2, wherein calculating the maximum brightness value according to the second light diffusion curve and the second brightness value comprises:

determining a second weight corresponding to each auxiliary pixel according to the second light diffusion curve and a second distance, wherein the second distance is a distance between the target pixel and the each auxiliary pixel;

calculating a sum of products of the second brightness value of a plurality of the auxiliary pixel points and the corresponding second weights to obtain the maximum brightness value.

6. The method according to claim 1, wherein calculating the pixel compensation value of the target pixel according to the image to be displayed and the compensation ratio comprises:

carrying out gamma transformation on the image to be displayed to obtain a transformed brightness value of the target pixel, wherein the transformed brightness value is a brightness value of the target pixel after the gamma transformation;

calculating the pixel compensation value according to the transformed brightness value and the compensation ratio.

7. The method according to claim 6, wherein calculating the pixel compensation value according to the transformed brightness value and the compensation ratio comprises:

calculating product of the transformed brightness value and the compensation ratio to obtain a supplementary brightness value;

converting the supplementary brightness value into gray scale to obtain the pixel compensation value.

8. The method according to claim 1, wherein a brightness value of each of the pixel points comprises a red light brightness value, a green light brightness value and a blue light brightness value, and the backlight brightness value is a maximum of a maximum red light brightness value, a maximum green light brightness value and a maximum blue light brightness value, and the maximum red light brightness value is a maximum of the red light brightness value of the pixel point in the panel partition, and the maximum green light brightness value is a maximum of the green light brightness value of the pixel point in the panel partition, and the maximum blue light brightness value is a maximum of the blue light brightness value of the pixel point in the panel partition.

9. A non-transitory computer-readable storage medium, wherein the non-transitory computer-readable storage medium comprises a stored program, the program executes the method according to claim 1.

10. A processor, wherein the processor is configured to run a program, the program executes the method according to claim 1 while the program is running.

11. A display system, comprising a display and an image display device, wherein the image display device is configured to perform the method according to claim 1.

12. An image display device, comprising:

a determination unit configured to determine a maximum brightness value of pixel points in a panel partition according to an image to be displayed to obtain a backlight brightness value corresponding to a backlight partition, wherein the panel partition is area where the backlight of the backlight partition is incident on the panel;

an acquisition unit configured to acquire a light diffusion curve of the backlight of the backlight partition incident on the panel partition corresponding to the backlight partition, wherein the light diffusion curve is a relationship curve between brightness value values of a plurality of the pixel points in a pixel group and diffusion distance, and the diffusion distance is a distance between the pixel point in the pixel group and the center of the panel partition, and the pixel point in the pixel group and a center of the panel partition are located on a same straight line;

a compensation ratio of a target pixel according to the light diffusion curve, the compensation ratio is a ratio of the maximum brightness value to an actual brightness value, and when meeting a first backlight condition, the actual brightness value is a brightness value of the target pixel of the panel partition corresponding to the backlight partition, and when meeting a second backlight condition, the maximum brightness value is a brightness value of the target pixel of the panel partition corresponding to the backlight partition, the first backlight condition is a case of the brightness value of the backlight partition is the backlight brightness value, and the second backlight condition is a case of the brightness value of the backlight partition is 255;

a second calculation unit configured to calculate a pixel compensation value of the target pixel point according to the image to be displayed and the compensation ratio;

an adjusting unit configured to adjust a pixel value of the target pixel point according to the pixel compensation value.

* * * * *